United States Patent [19]

Mileti

[11] 4,190,275
[45] Feb. 26, 1980

[54] IMPACT ATTENUATOR

[75] Inventor: Robert A. Mileti, Marblehead, Mass.

[73] Assignee: Fibco Inc., Tewksbury, Mass.

[21] Appl. No.: 887,127

[22] Filed: Mar. 16, 1978

[51] Int. Cl.² .................. B60R 19/04; B60R 19/08
[52] U.S. Cl. ................................ 293/102; 293/142
[58] Field of Search .................. 293/73, 71, 75, 78, 293/97, 118, 107, 121, 149, 146, 102, 108, 110; 264/164; 256/13.1

[56] References Cited

U.S. PATENT DOCUMENTS

| | | | |
|---|---|---|---|
| 3,674,115 | 7/1972 | Young et al. | 293/107 |
| 3,729,221 | 4/1973 | Granig | 293/73 |
| 3,907,353 | 9/1975 | Dinitz | 293/107 |
| 3,919,380 | 11/1975 | Smarook et al. | 264/275 |
| 4,029,350 | 6/1977 | Goupy et al. | 293/110 |
| 4,076,296 | 2/1978 | Ditto et al. | 293/97 |

Primary Examiner—Richard A. Bertsch
Attorney, Agent, or Firm—LeBlanc, Nolan, Shur & Nies

[57] ABSTRACT

A lightweight reusable impact attenuator adapted to be carried by a truck or a similar vehicle required to operate in a hazardous location in which it is exposed to rear end collisions.

The impact attenuator is also useful in stationary installations particularly in urban areas where vehicle speeds are usually low and available space may be severely restricted.

1 Claim, 9 Drawing Figures

U.S. Patent Feb. 26, 1980 Sheet 1 of 3 4,190,275
FIG.1
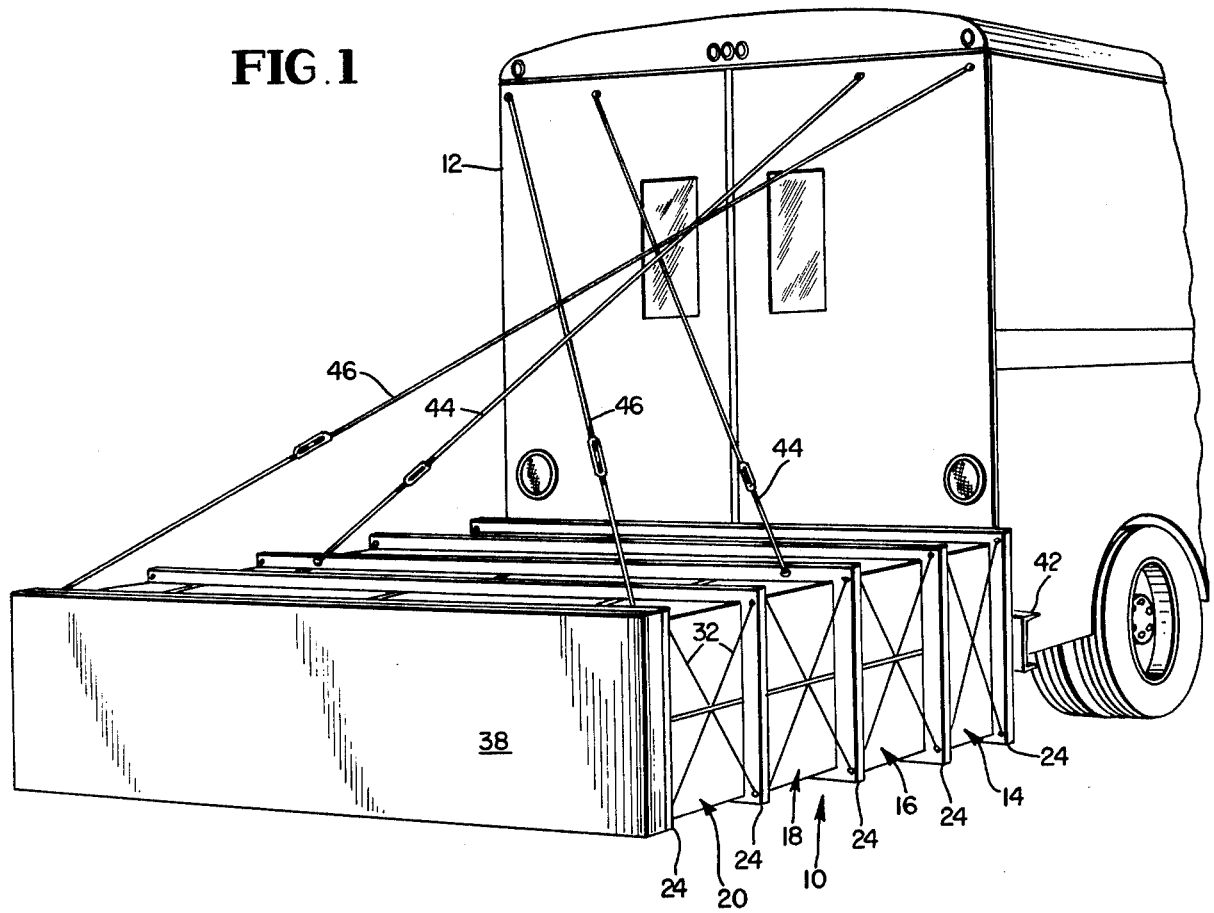
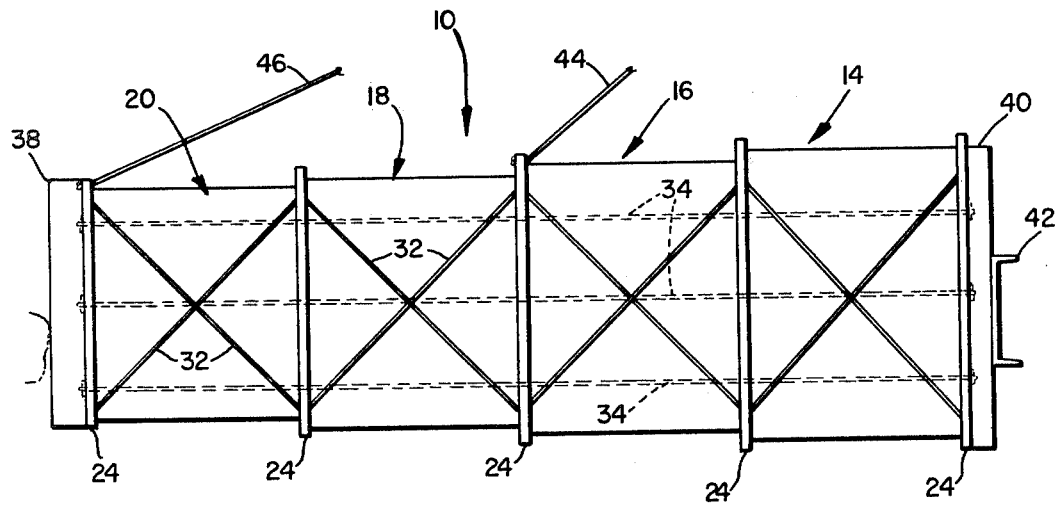
FIG.2

IMPACT ATTENUATOR

BACKGROUND OF THE INVENTION

In recent years much attention has been given to the design and construction of impact attenuators or barriers to control the rate of deceleration of an errant vehicle as it approaches an obstruction or a fixed hazard adjacent a highway. Examples of such impact attenuators which have been used successfully are disclosed in U.S. Pat. Nos. 3,606,258 and 3,674,115. Other prior proposals are reflected in U.S. Pat. Nos. 3,643,924, 3,856,268 and 3,880,404.

In general each of these devices is of substantial mass and effects deceleration of the impacting vehicle by momentum exchange. In some cases, for example, the barrier disclosed in U.S. Pat. No. 3,606,258 the unit is sacrificial and is intended to be partially or totally destroyed upon impact. In other cases, such as disclosed in U.S. Pat. No. 3,674,115, the barrier is intended to be reusable. However, barriers of this type are relatively costly and frequently require substantial repair or service before they may be reused.

Other impact attenuators employ steel drums or bands which, upon impact, are permanently deformed and which accordingly can not be reused. An example of this type of barrier is disclosed in U.S. Pat. No. 3,141,655.

Neither these prior proposals nor any other presently known prior proposal satisfies the specialized and rigorous requirements imposed by a truck mounted impact attenuator.

SUMMARY OF THE INVENTION

It is the principal purpose and object of the present invention to provide improved impact attenuators which are of light weight, low cost, relatively compact construction and are thus particularly suited for use as a truck mounted attenuator and which with slight modification are also particularly adapted for use in stationary installations particularly in urban areas where vehicle speeds are moderate and available space is limited.

It is also an important object of the present invention to provide improved impact attenuators which, upon moderate impact, are essentially self-restoring to their original condition and are thus essentially immediately effective to receive additional impacts without requiring repair or other attention from maintenance personnel.

It is a further important object of the present invention to provide an improved impact attenuator which is effective to decelerate vehicles of widely varying weight at a rate which closely approximates the ideal rate, i.e., a relatively low, relatively constant rate of deceleration.

In attaining these and other objects, the present invention provides an impact attenuator comprising a plurality of expanded plastic sheets formed into a quasi-honeycomb structure, the expanded plastic sheets being sandwiched between stiffeners which may be fabricated from commonly available material such as plywood. The plastic sheets and stiffener sheets are assembled into groups or packets and are secured together and a plurality of packets are then joined by wires or cables. The entire unit is then cable supported from the rear of the truck.

Alternatively, the unit may be mounted in front of and secured to a fixed hazard. In such an installation the unit is preferably supported on rails which extend away from the hazard in the direction of oncoming traffic.

Additional objects and advantages will become apparent as the description proceeds in connection with the accompanying drawings.

THE DRAWINGS

FIG. 1 is a perspective view of a typical installation of the impact attenuator of the present invention;

FIG. 2 is a side elevation of the attenuator of FIG. 1;

Figure 4:
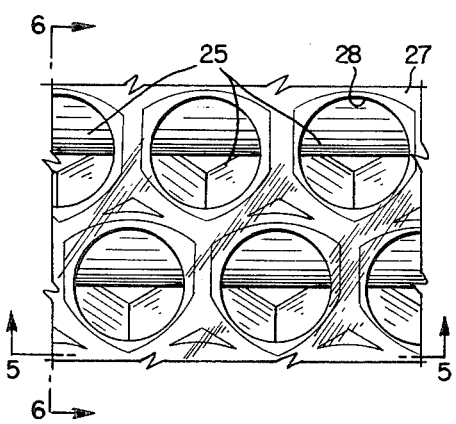
FIG. 4 is an enlarged fragmentary view of a portion of the plastic sheet which forms the basic component of the attenuator.
Figure 5:
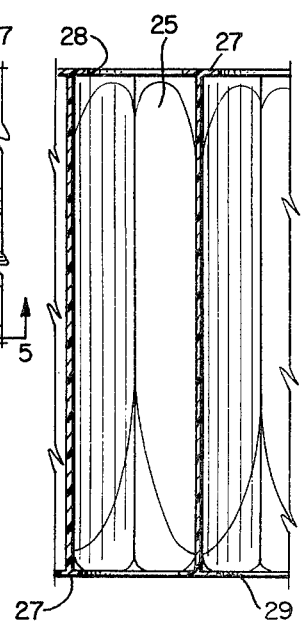
Figure 6:
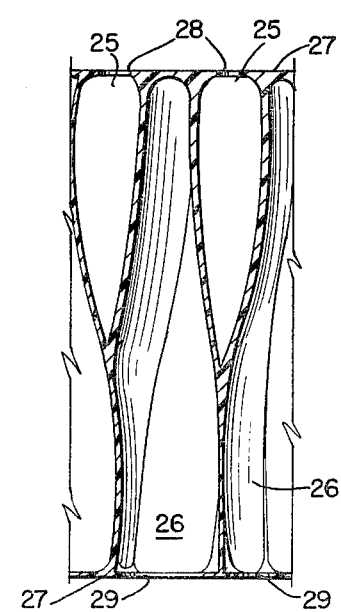
Figure 7:
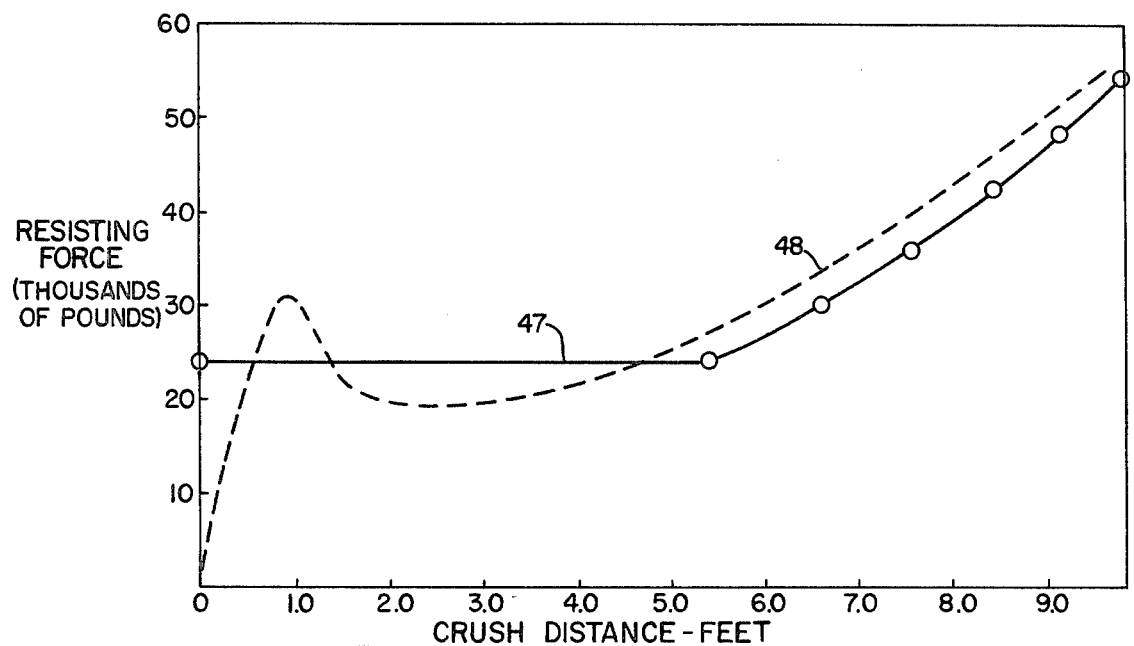
Figure 8:
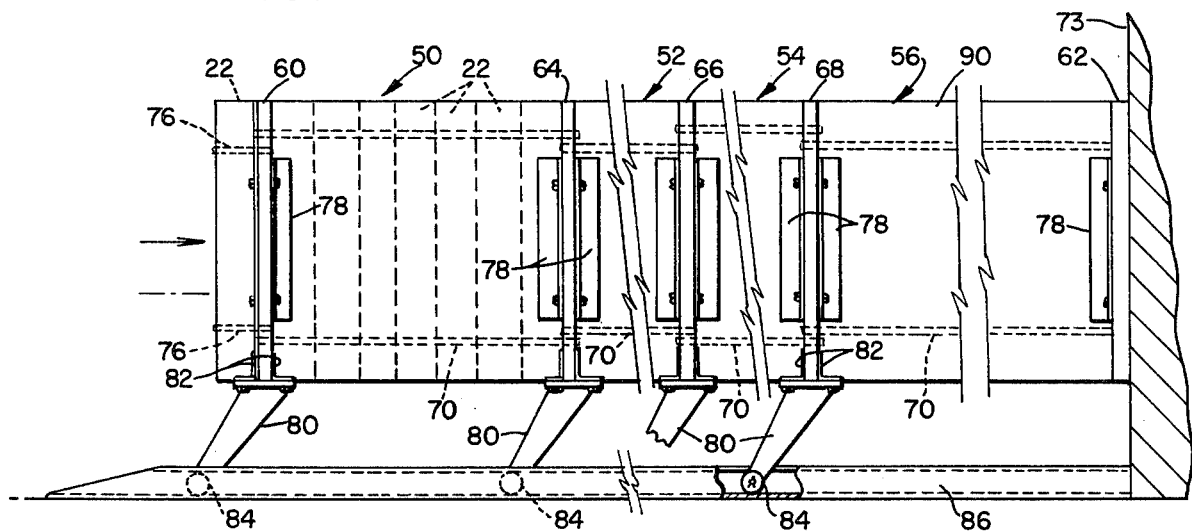
Figure 9:
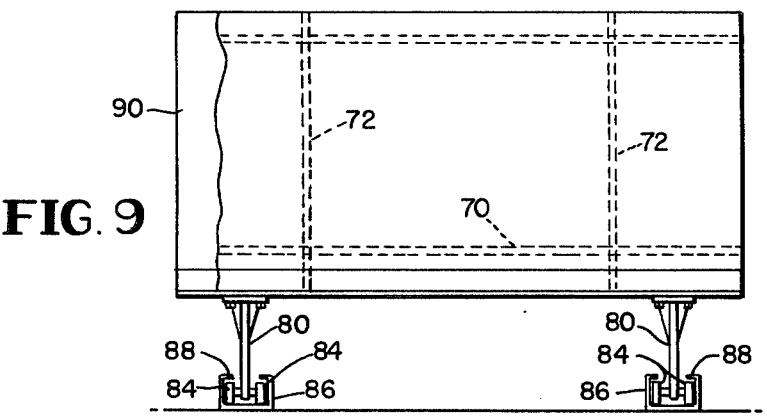

FIGS. 5 and 6 are enlarged fragmentary sections taken along lines 5—5 and 6—6, respectively, of FIG. 4;

FIG. 7 graphically illustrates the performance of a typical attenuator in accordance with the present invention;

FIG. 8 is a side elevation of the attenuator of the present inventin installed adjacent a fixed hazard; and FIG. 9 is an end view of the attenuator of FIG. 8.

DESCRIPTION OF PREFERRED EMBODIMENTS

Figure 3:
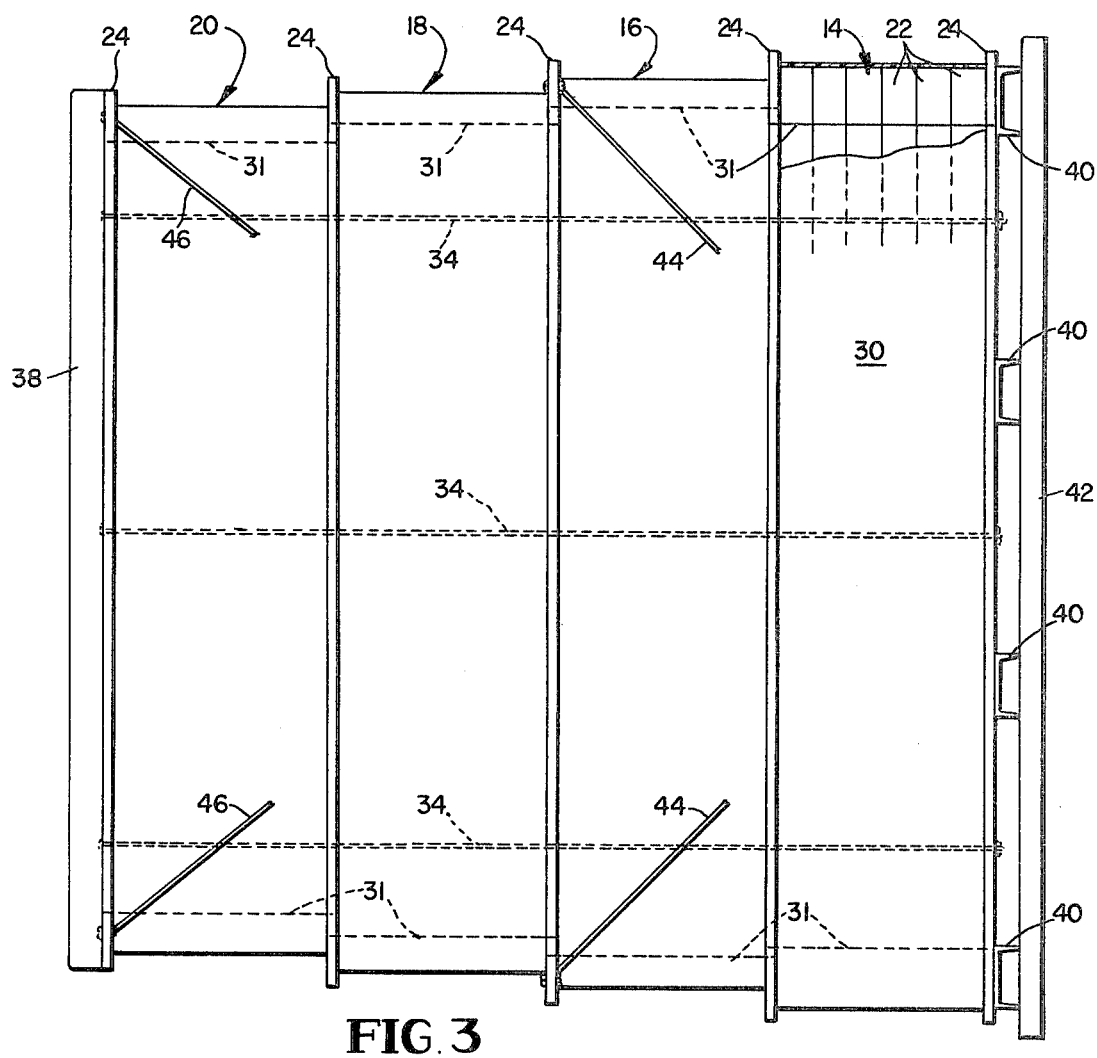
FIG. 3 is a top view of the attenuator of FIG. 1.

FIGS. 1, 2 and 3, to which particular reference will now be made, illustrate the impact attenuator of the present invention, indicated generally at 10, supported on the rear end of a truck 12 in position to effectively decelerate an errant vehicle as it approaches the truck to protect both the truck and the impacting vehicle from damage and to protect the occupants of the vehicle from injury.

The attenuator 10 comprises a series, for example, four individual modules 14, 16, 18 and 20 which, except for their length and width, may be of identical construction. In a typical case, each module comprises a series of expanded plastic sheets 22 sandwiched in face-to-face contact between stiffener plates 24 which are preferably fabricated from plywood or similar material.

The individual plastic sheets, a portion of one which is shown in FIGS. 4, 5 and 6 are fabricated from a thermoplastic polymer ionomer resin sold by E. I. DuPont under the trademark SURLYN. As originally manufactured the sheets are of solid plastic material having a thickness of approximately 0.187 inches. The sheets are then expanded in accordance with the process disclosed in U.S. Pat. Nos. 3,919,380 and 3,919,382 to form a sheet as illustrated in FIGS. 4, 5 and 6 having a thickness of approximately 3.5 inches. In its expanded form the sheets, which are quite similar to the sheets shown in FIGS. 8 and 9 of U.S. Pat. No. 3,919,380, have a quasi-honeycomb structure. However, rather than a hexagonal prismatic cell of the true honeycomb the expanded plastic sheet has interlocking oppositely facing open-ended pyramidal cells 25 and 26 the axis of which are essentially parallel and extend normal to the opposite faces 27 of the sheets. The bases of the cells are open through circular openings 28 and 29 in the respective sheet faces 27.

A suitable number, typically six or seven sheets are assembled in face-to-face contact and then wrapped with a tough weather proof vinyl wrapping 30. The wrapping is provided to prevent the entry of moisture and other foreign material into the cells of the individual sheets, to restrain the sheets against lateral or vertical displacement and to improve the appearance of the unit. The wrapped modules or packets are then secured to the stiffener panels, 24 by a suitable number of steel straps 31.

To hold the individual bundles or modules together in their desired configuration, diagonal cables 32 are provided between the end edges of adjacent stiffeners panels. The entire unit is also held under light tension by cables 34 which extend between the end stiffener plates 24.

Preferably an additional expanded sheet 38 like the sheets 22 is secured to the outermost surface of the outermost stiffener panel 24 in position to receive an impact by a vehicle.

The unit thus far described may be secured to the rear of a truck or similar vehicle by any suitable means. In the illustrated embodiment, four vertical metal channels 40 are securely bolted to the end stiffener panel 24 and to the truck bumper 42. To ensure that the unit will be retained in its desired position and configuration the outer end and mid portion of the unit are preferably supported by sets of cables 44 and 46 which connect the outermost and intermediate stiffener plates 24 to the upper portion of the vehicle.

While the dimensions of the attenuator may be varied, in a typical case the unit will be between 7 and 8 feet wide, slightly less than 8 feet long and from 24 to 30 inches high. The weight of this typical attenuator, exclusive of the four vertical metal channels 40, will be less than 900 pounds. Further, in the preferred form the individual modules or packets are of slightly different size, the module secured to the truck being the largest and each succeeding module being slightly smaller in a direction away from the truck thus imparting a slight pyramidal shape to the attenuator.

The attenuator is so mounted that its longitudinal centerline is approximately 23 inches above the ground surface, which is substantially at or slightly above the height of the center of gravity of the average automotive vehicle. Because of this dimensional relationship the tendency of the vehicle to be deflected upwardly or downwardly upon impact is minimized.

Actual tests have demonstrated that the attenuator of the present invention is effective to decelerate a 4500 pound automobile impacting the attenuator at a speed of 50 mph without exceeding acceptable deceleration rates, thus minimizing damage to the impacting vehicle and injury to its occupants and substantially eliminating altogether damage to the truck upon which the attenuator is mounted. The attenuator will be equally effective in the deceleration of a lighter vehicle, i.e., vehicle weighing 2000 lbs. It has also been determined that the performance of the expanded cellular plastic material closely approximates the theoretically ideal performance of an impact attenuator.

FIG. 7, to which reference will now be made, illustrates a comparison between the ideal attenuator performance and the expected performance of the attenuator of the present invention. As is well known in the art, the resisting force offered by the attenuator upon impact equals the mass of the vehicle times its acceleration. Obviously, if the resisting force is contant, acceleration is inversely proportional to the vehicle weight. Many impact attenuators, which supply a constant resisting force, will cause lighter vehicles to be subjected to substantially higher accelerations than heavier vehicles.

It is an important feature of the present invention that the resisting force offered by the attenuator varies with crush distance. Accordingly, a vehicle of relatively low weight will be stopped in a shorter distance than a heavier vehicle but at the same time the acceleration imposed on the smaller vehicle will not exceed the acceleration imposed on the larger vehicle.

As shown by the solid line 47 in FIG. 7, the ideal impact attenuator will exert a substantially constant resisting force during the initial phase of impact, the force rising as the crush distance increases. For example, to decelerate a 2000 pound vehicle without exceeding a deceleration of 12 g (except for acceptable short duration peaks) the attenuator exerts a resisting force of approximately 24000 pounds over a distance of less than 6 feet. A heavier vehicle will be subjected to the same resisting force which will produce a lower rate of deceleration. Accordingly, the heavier vehicle will still possess substantial velocity and kinetic energy when it reaches the point at which the smaller vehicle has been brought to rest. After this point, the resisting force should and may rise without imposing an unacceptable deceleration rate on the heavier vehicle. The predicted performance of the attenuator of the present invention is shown on the dotted line 48 from which the close similarity between the actual performance of the attenuator of the present invention and the ideal performance of such an attenuator is readily apparent.

This performance is due to the nature of the plastic cellular material, to the thickness of the original solid sheet of plastic material and to the height to which it is drawn. It has been determined that an attenuator as above described in which the individual sheets 22 are fabricated from a commercially available SURLYN plastic sheet having an original thickness of 0.187 inches drawn to a height of 3.5 inches effectively produces the desired performance. Substantial variations from either of these dimensions will adversely effect the performance of the attenuator. Different requirements for the attenuator, such as a different range of anticipated impacting vehicle weights or restrictions on the size of the largest attenuator which may be used, may require a variation in the original sheet thickness in the range of 0.125 inch to 0.250 inch and a draw height range of 2.5 inches to 4.0 inches.

A further important feature of the present invention is the reusable or regenerative character of the barrier. Actual experience has established that the individual plastic cellular sheets may be compressed to 10% of their normal height, without significant structural damage. After release of the compressive load the sheets will resume their original height within a matter of minutes, and thus may require little or no attention from maintenance personnel to ready them for reuse.

As indicated above, the attenuator of the present invention is also particularly adapted for use in a stationary installation adjacent a fixed hazard such as a bridge pier. A slightly modified form of the attenuator suitable for such use is shown in FIGS. 8 and 9 to which reference will now be made. In its modified form the attenuator comprises 4 essentially identical modules 50, 52, 54 and 56, each module comprising 7 of the cellular plastic sheets 22 described above. As in the previously described embodiment the attenuator has end stiffener plates 60 and 62 of plywood or similar sheet material and intermediate plates 64, 66 and 68.

As in the previous embodiment, the individual modules or bundles are held together by metal straps 70 which extend horizontally around the individual bundles and pass through the adjacent stiffener plates, and additional sets of straps 72 which pass vertically around the individual bundles and also attach to the stiffener plates. The inner most stiffener plate 62 may be secured to the fixed hazard 73 or may simply abut the hazard without attachment. The outer most end of the attenuator is formed by a single sheet of cellular plastic 22 suitably secured as by straps 76 to the outer most stiffener plate 60. To assist in holding the individual plastic sheets against lateral displacement upon impact a series of angle irons 78 are secured to the opposite lateral edges of each of the stiffener plates.

The attenuator also includes a unique support system which permits free longitudinal movement of the individual modules or bundles but which prevents vertical or lateral displacement of the modules. The support mechanism includes a series of brackets 80 each secured at their upper ends to a pair of angle irons 82 which extend across and are secured to the lower edges of the stiffener plates 60, 64, 66 and 68. At their lower ends the brackets 80 each carry a pair of wheels or rollers 84 received in rails 86 bolted to the roadway. The rails include inturned flanges 88 to retain the wheels and the entire attenuator from vertical or lateral displacement upon impact.

Preferably the attenuator is protected from abrasion by wrapping the sides and the free end of the attenuator which a heavy urethane conveyor belting 90.

While the dimensions of the attenuator may be varied to suit the requirements of a particular installation, in a typical case the attenuator will have an overall length of approximately 9 feet, a height of approximately 24 inches, and a width of approximately 48 inches. To prevent imparting an upward or downward motion to the nose of an impacting vehicle, the attenuator is supported above ground to dispose its horizontal center line approximately 22 inches above ground level, which, as noted above, is approximately the height of the center of gravity of the average automotive vehicle.

The performance of the attenuator of FIGS. 8 and 9 is essentially the same as the embodiment of FIGS. 1–4.

I claim:

1. An impact attenuator for decelerating a vehicle as it approaches a fixed hazard adjacent to a roadway comprising a plurality of expanded plastic sheets, each sheet having opposed essentially flat faces extending essentially normal to the path of the vehicle, a plurality of cells extending between said faces, the longitudinally axes of said cells being essentially parallel and normal to the planes of said faces, said sheets being from 2.5 inches to 4 inches thick and formed by drawing a solid plastic sheet having an initial thickness of from 0.125 inches to 2.50 inches, said sheets being adapted to be compressed upon impact to substantially less than half their normal thickness without structural damage and thereafter resume their normal thickness, means securing a plurality of said sheets together in face to face contact to form a columnar structure, stiffening panels interposed between certain of said sheets at intervals along the length of said structure, and means for supporting said columnar structure to dispose the central portion thereof above ground level substantially at the height of the center of gravity of the vehicle in position to intercept said vehicle as it approaches said hazard, said last-mentioned means comprising a pair of rails extending away from said hazard at ground level, and rail engaging means carried by said stiffening panels and effective to prevent lateral and vertical displacement of said columnar structure upon impact by a vehicle, said columnar structure being effective to exert a resisting force upon impact which increases as a direct function of the distance to which said impacting vehicle penetrates said structure.

* * * * *